(12) United States Patent
Wood

(10) Patent No.: US 9,102,397 B2
(45) Date of Patent: Aug. 11, 2015

(54) AIRFOILS INCLUDING TIP PROFILE FOR NOISE REDUCTION AND METHOD FOR FABRICATING SAME

(75) Inventor: Trevor Howard Wood, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 752 days.

(21) Appl. No.: 13/330,766

(22) Filed: Dec. 20, 2011

(65) Prior Publication Data

US 2013/0156583 A1 Jun. 20, 2013

(51) Int. Cl.
*F01D 5/14* (2006.01)
*B64C 11/18* (2006.01)
*F01D 1/26* (2006.01)
*B64D 27/00* (2006.01)

(52) U.S. Cl.
CPC ............... *B64C 11/18* (2013.01); *F01D 5/141* (2013.01); *B64D 2027/005* (2013.01); *F01D 1/26* (2013.01); *Y02E 10/722* (2013.01); *Y02T 50/66* (2013.01); *Y10T 29/49336* (2015.01)

(58) Field of Classification Search
CPC .... B64C 11/18; B64D 2027/005; F01D 1/26; F01D 5/141; Y02E 10/722; Y02T 50/66
USPC .......... 416/120, 124, 128, 129, 223 R, 223 A, 416/228, 238
See application file for complete search history.

(56) References Cited

U.S. PATENT DOCUMENTS

| | | | |
|---|---|---|---|
| 3,993,414 A * | 11/1976 | Meauze et al. ................. | 415/181 |
| 5,513,952 A * | 5/1996 | Mizuta et al. .............. | 415/182.1 |
| 6,203,273 B1 | 3/2001 | Weiner et al. | |
| 6,338,609 B1 * | 1/2002 | Decker et al. ............... | 415/173.1 |
| 6,358,003 B2 * | 3/2002 | Schlechtriem ................ | 415/181 |
| 6,931,844 B2 | 8/2005 | Iwao et al. | |
| 7,004,722 B2 * | 2/2006 | Teramura et al. ............. | 415/119 |
| 7,144,221 B2 | 12/2006 | Giffin | |
| 7,249,732 B2 | 7/2007 | Sanders et al. | |
| 7,476,086 B2 * | 1/2009 | Wadia et al. .............. | 416/223 R |
| 7,503,747 B2 | 3/2009 | Ikeda | |

(Continued)

FOREIGN PATENT DOCUMENTS

| | | |
|---|---|---|
| CN | 1519485 A | 8/2004 |
| CN | 1727653 A | 2/2006 |

(Continued)

OTHER PUBLICATIONS

Yu et al., "Rotor Blade—Vortex Interaction Noise", Progress in Aerospace Sciences, vol. 36, Issue 2, pp. 97-115, Feb. 2000.

(Continued)

*Primary Examiner* — Edward Look
*Assistant Examiner* — Christopher R LeGendre
(74) *Attorney, Agent, or Firm* — Scott J. Asmus

(57) ABSTRACT

An airfoil, a fan assembly and an unducted contra-rotating fan engine include fabricating at least one airfoil including a suction and a pressure side coupled together at a leading and a trailing edge and extending therebetween. The airfoil includes a plurality of chord sections having a chord length. The airfoil including a tip profile defining a reducing slope extending from the leading edge at the tip portion along at least a portion of the chord length. The tip profile is configured to reduce the high unsteady pressure near the tip portion of the airfoil.

14 Claims, 5 Drawing Sheets

(56) References Cited

U.S. PATENT DOCUMENTS

| | | |
|---|---|---|
| 7,735,773 B2 | 6/2010 | Schwaiger |
| 8,083,487 B2 | 12/2011 | Wood et al. |
| 8,221,081 B2 * | 7/2012 | Lebrun .................. 416/129 |
| 8,317,482 B2 | 11/2012 | Bois et al. |
| 8,647,054 B2 * | 2/2014 | Aulich et al. ............ 415/119 |
| 2004/0028526 A1 * | 2/2004 | Teramura et al. .......... 415/220 |
| 2009/0025365 A1 | 1/2009 | Schilling et al. |
| 2009/0220346 A1 | 9/2009 | Schlüter et al. |
| 2010/0047068 A1 | 2/2010 | Parry et al. |
| 2010/0124500 A1 * | 5/2010 | Lebrun .................. 416/128 |
| 2010/0206982 A1 | 8/2010 | Moore et al. |
| 2011/0189020 A1 * | 8/2011 | Aulich et al. ............ 416/182 |
| 2011/0202321 A1 | 8/2011 | Lung et al. |
| 2013/0149108 A1 * | 6/2013 | Webster ................ 415/119 |
| 2013/0156583 A1 * | 6/2013 | Wood .................. 416/198 A |
| 2013/0164140 A1 * | 6/2013 | Shah et al. ............... 416/223 A |
| 2013/0336761 A1 * | 12/2013 | Evans ..................... 415/9 |
| 2014/0017086 A1 * | 1/2014 | Charier et al. ............ 416/128 |

FOREIGN PATENT DOCUMENTS

| | | | | |
|---|---|---|---|---|
| CN | 101178012 A | | 5/2008 | |
| FR | 996967 A | * | 12/1951 | |
| GB | 1247966 A | | 9/1971 | |
| GB | 2179405 A | * | 3/1987 | ............... F01D 5/22 |
| JP | 2009013984 A | | 1/2009 | |
| WO | WO 2009098340 A1 | * | 8/2009 | |

OTHER PUBLICATIONS

Chinese Office Action issued in connection with corresponding CN Application No. 201210557571.6 on Apr. 3, 2015.

* cited by examiner

AIRFOILS INCLUDING TIP PROFILE FOR NOISE REDUCTION AND METHOD FOR FABRICATING SAME

STATEMENT REGARDING FEDERALLY SPONSORED RESEARCH OR DEVELOPMENT

This invention was made with Government support under DTFAWA-10-C-00046 awarded by United States Department of Transportation Federal Aviation Administration. The Government has certain rights in this invention.

BACKGROUND

Embodiments presented herein relate generally to aerodynamic surfaces configured for noise reduction, and more specifically to configuration of a tip portion on an aerodynamic surface, such as an airfoil, for noise reduction.

At least some known machines including aerodynamic surfaces such as, but not limited to, wind turbines, aircraft airframes, aircraft engines, gas turbine engines and steam turbine engines, include a plurality of stationary and/or rotating airfoils which are subject to impinging wakes and vortices generated from an upstream object, such as an upstream bladerow or an input unsteady airflow. The upstream generated wakes and vortices are channeled downstream where they may impinge on the leading edge of downstream airfoils. In one instance, the wake flow impingement, from an upstream object, on the downstream airfoils moving relative to each other is a dominant source of aerodynamic noise and aeromechanical loading generated in turbomachinery applications.

Of particular interest are unducted, contra-rotating engines which have been developed such as the GE 36 engine, frequently referred to as an unducted fan (UDF) or propfan engine. In some known unducted contra-rotating engines, noise may be generated by an upstream rotating airfoil's wake impinging on a leading edge of a contra-rotating airfoil located downstream. In other known instances, noise may be generated by an upstream stator component's wake impinging on a leading edge of a rotating airfoil downstream from the component.

Noise generated by aircraft engines may be constrained by international and local regulations, thereby creating a need to balance fuel efficiency and emissions with noise pollution. A dominant source of aerodynamic noise and aeromechanical loading generated in turbomachinery applications is the interaction of wakes from upstream bladerows on downstream bladerows or vanes moving relative to each other. As previously indicated, examples include fan wakes and vortices interacting with downstream contra-rotating fan blades, whereby open rotor noise may be generated by the forward-aft rotor interaction. In addition, of interest is turbomachinery noise from stator vane wakes impinging on downstream rotor blades. The impinging wake flow on the airfoil's leading edge may result in an increase in noise radiated from the turbomachinery, as well as a potential increase in aeromechanical loading on the bladerow. At least some known methods of reducing the noise generated by these unsteady wake flows impinging on airfoils include increasing the distance between the upstream object or airfoil and the downstream airfoil. This increased distance mixes the wake flow and thus reduces the amplitude of the wake flow forcing unsteady motion of the tip vortex of the downstream airfoil. However, increasing the distance between an upstream object, such as another airfoil, and the downstream airfoil may increases the size, weight, and cost of the engine, and thereby reduce the efficiency and performance of the engine.

BRIEF DESCRIPTION

In accordance with one exemplary embodiment, an airfoil is disclosed. The airfoil comprising: a root portion and a tip portion, wherein the tip portion is configured extending radially outward from the root portion; a suction side and a pressure side coupled together at a leading edge and a trailing edge spaced chord-wise and downstream from the leading edge; a plurality of chord sections having a chord length and extending in a chord-wise direction between the leading edge and the trailing edge of the airfoil and spaced apart along a length of the airfoil in a span-wise direction between the root portion and the tip portion; and a tip profile defining a reducing slope extending from the leading edge at the tip portion along at least a portion of the chord length, wherein the tip profile is configured to reduce high unsteady pressure near the tip portion of the airfoil.

In accordance with another exemplary embodiment, a fan assembly is disclosed. The fan assembly comprising: a disk; and a plurality of fan blades coupled to the disk, each blade of the plurality of fan blades comprising: an airfoil portion comprising a suction side and a pressure side coupled together at a leading edge and a trailing edge spaced chord-wise and downstream from the leading edge; a plurality of chord sections having a chord length and extending in a chord-wise direction between the leading edge and the trailing edge of the airfoil and spaced apart along a length of the airfoil in a span-wise direction between the root portion and the tip portion; and a tip profile defining a reducing slope extending from the leading edge at the tip portion along at least a portion of the chord length, wherein the tip profile is configured to reduce high unsteady pressure near the tip portion of the airfoil.

In accordance with another exemplary embodiment, an unducted contra-rotating fan engine is disclosed. The unducted contra-rotating fan engine comprising: an unducted fan section including a first fan blade row and a second fan blade row axially spaced aftward from the first fan blade row, the second fan blade row including a plurality of airfoils, each airfoil comprising: a root portion and a tip portion, wherein the tip portion is configured extending radially outward from the root portion; a suction side and a pressure side coupled together at a leading edge and a trailing edge spaced chord-wise and downstream from the leading edge; a plurality of chord sections having a chord length and extending in a chord-wise direction between the leading edge and the trailing edge of the airfoil and spaced apart along a length of the airfoil in a span-wise direction between the root portion and the tip portion; and a tip profile defining a reducing slope extending from the leading edge at the tip portion along at least a portion of the chord length, wherein the tip profile is configured to reduce high unsteady pressure near the tip portion of the airfoil.

In accordance with another exemplary embodiment, a method of fabricating an airfoil is disclosed. The method of fabricating an airfoil comprising: fabricating at least one airfoil including a suction side and a pressure side coupled together at a leading edge and a trailing edge spaced chord-wise and downstream from the leading edge; wherein the airfoil includes a plurality of chord sections having a chord length and extending in a chord-wise direction between the leading edge and the trailing edge of the airfoil and spaced apart along a length of the airfoil in a span-wise direction between the root portion and the tip portion, said tip portion comprises: a tip profile defining a reducing slope with no slope discontinuity extending from the leading edge at the tip portion along at least a portion of the chord length, wherein the tip profile is configured to reduce high unsteady pressure near the tip portion of the airfoil.

DRAWINGS

The above and other aspects, features, and advantages of the present disclosure will become more apparent in light of the subsequent detailed description when taken in conjunction with the accompanying drawings in which.

DETAILED DESCRIPTION

Generally provided are exemplary apparatus and methods for fabricating an airfoil such as, but not limited to, for use in a device incorporating aerodynamic surfaces, and more particularly for use in a rotary device, such as, but not limited to, an open rotor propulsion system. The embodiments described herein are not limiting, but rather are exemplary only. It should be understood that the exemplary apparatus and methods for fabricating an airfoil disclosed herein may apply to any type of airfoil or aerodynamic surface, such as, but not limited to, fan blades, rotor blades, ducted fan blades, unducted fan blades, turbine engine, wind turbines, aircraft wing high-lift systems and/or aircraft structures. More specifically, the exemplary apparatus and methods for fabricating an airfoil disclosed herein may apply to any airfoil, or aerodynamic surface, that is subject to impinging wakes and vortices generated upstream of the airfoil.

Although the embodiments described herein are described in connection with an open rotor propulsion system, also referred to herein as an unducted contra-rotating front fan high bypass ratio engine, or UDF, it should be apparent to those skilled in the art that, with appropriate modification, the apparatus and methods can be suitable for any device including airfoils that are subject to impinging wakes and vortices generated upstream of the airfoil and for which tip vortex noise related to self- and gust-interaction is of interest.

Figure 1:
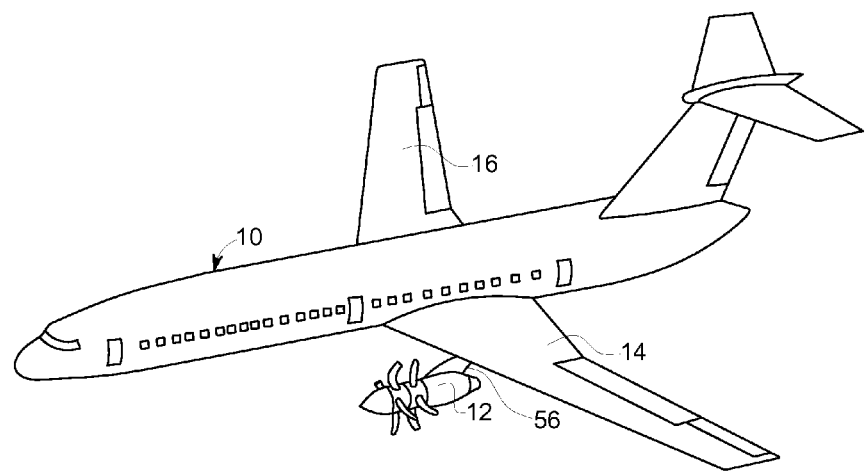
FIG. 1 is a perspective view showing an aircraft supporting an engine including airfoils having a tip profile in accordance with an embodiment.

Referring now to FIG. 1, there is shown an aircraft 10 supporting an engine assembly 12 in accordance with one embodiment. The aircraft 10 is shown having a pair of swept back wings 14 and 16. Mounted on wing 14 is the engine assembly 12, and more particularly in an embodiment, an unducted contra-rotating front fan high bypass ratio engine assembly, also referred to herein as an open-rotor propulsion system. It will be noted, that such mounting is by means of a pylon 56 reaching down from the wing and supporting the engine. The pylon configuration shown is not intended to be limiting and that additional pylon configurations are anticipated (e.g. pusher configurations and puller configurations) and that the disclosed tip profile is not limited by engine architecture.

Figure 2:
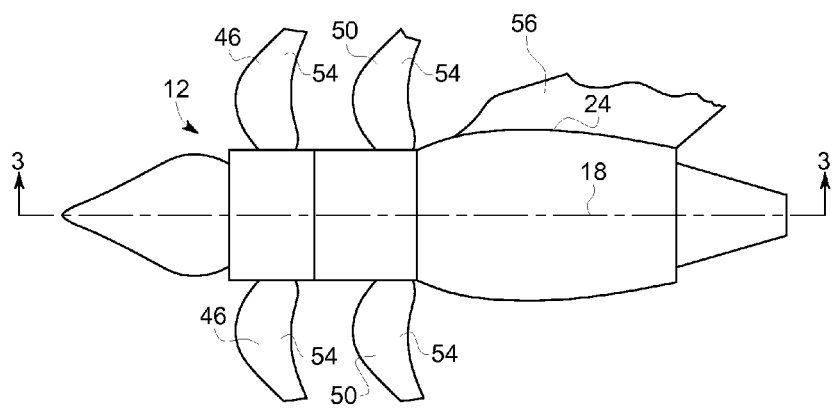
FIG. 2 is an enlarged side view of the engine shown in FIG. 1.
Figure 3:
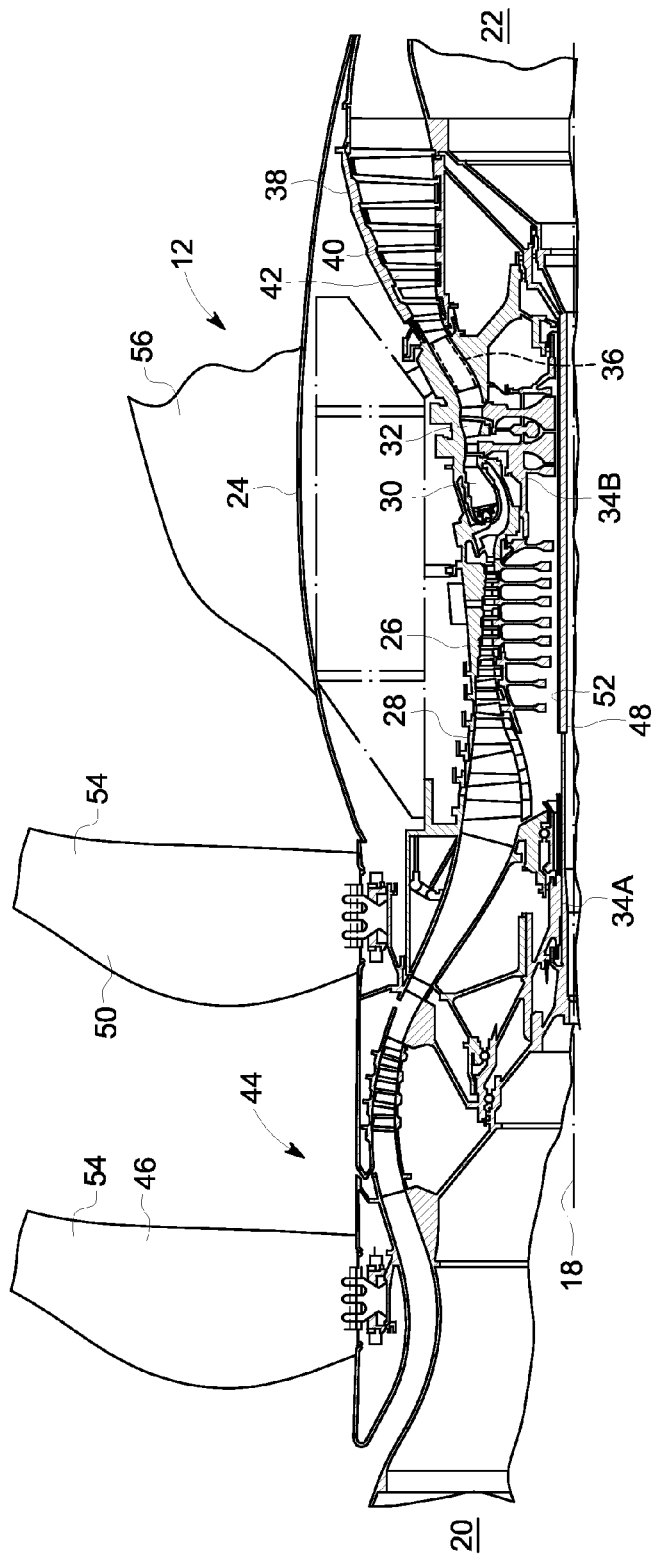
FIG. 3 is a schematic cross-section taken through line 3-3 of FIG. 2, illustrating an unducted contra-rotating fan engine including airfoils having a tip profile in accordance with an embodiment.

FIG. 2 shows an enlarged side view of the engine assembly 12 of FIG. 1. FIG. 3 illustrates a sectional view taken through line 3-3 of the engine assembly 12 of FIG. 2 according to an embodiment wherein like parts are identically referenced. Engine assembly 12 includes a longitudinal center line axis 18 that extends through the engine assembly 12 from front to back (from left to right on FIGS. 2 and 3). Flow through the illustrated exemplary engine is generally from front to back. The direction parallel to the center line axis 18 toward the front of the engine and away from the back of the engine will be referred to herein as the "upstream" direction 20, while the opposite direction parallel to the center line axis 18 will be referred to herein as the "downstream" direction 22.

The engine assembly 12 has an outer shell, or an outer casing 24 disposed co-axially about center line axis 18. Outer casing is conventionally referred to as a nacelle.

Engine assembly 12 also includes a gas generator referred to as core engine 26. Such core engine includes a compressor 28, a combustor 30 and a high pressure turbine 32, either singular or multiple stages.

At the forward part of the engine 12, there is provided a front fan section 44. Fan section 44 includes a first fan blade row 46 connected to a forward end of an inner contra-rotating shaft 48 which extends between the power turbine 38 and the fan section 44. Front fan section 44 includes a second fan blade row 50 connected to the forward end of an outer drive shaft 52 also connected between the power turbine 38 and the fan section 44. Each of the first and second fan blade rows 46 and 50 comprises a plurality of circumferentially spaced airfoils 54, or fan blades. Fan blade rows 46 and 50 are contra-rotating which provides a higher propulsive efficiency. It should be appreciated that the contra-rotating fan blade row 50 serves to remove the swirl on the circumferential component of air imparted by the contra-rotating fan blade row 46.

An important feature of the engine design is the positioning and design of the fan blade rows 46 and 50. Initially, in order to reduce the noise resulting from the fan blade rows 46 and 50, sufficient spacing must be provided between the fan blade rows. As described below, the airfoils 54 in blade row 50 are further configured to include a tip profile as described herein, to minimize tip vortex noise related to self- and gust-interaction. The airfoils 54 in blade row 46 may also be configured to include a tip profile as described herein, and it is understood that descriptions henceforth for the novel tip profile described in this disclosure applied to the downstream blade row are potentially equally applicable to the upstream blade row.

Figures 4, 5:
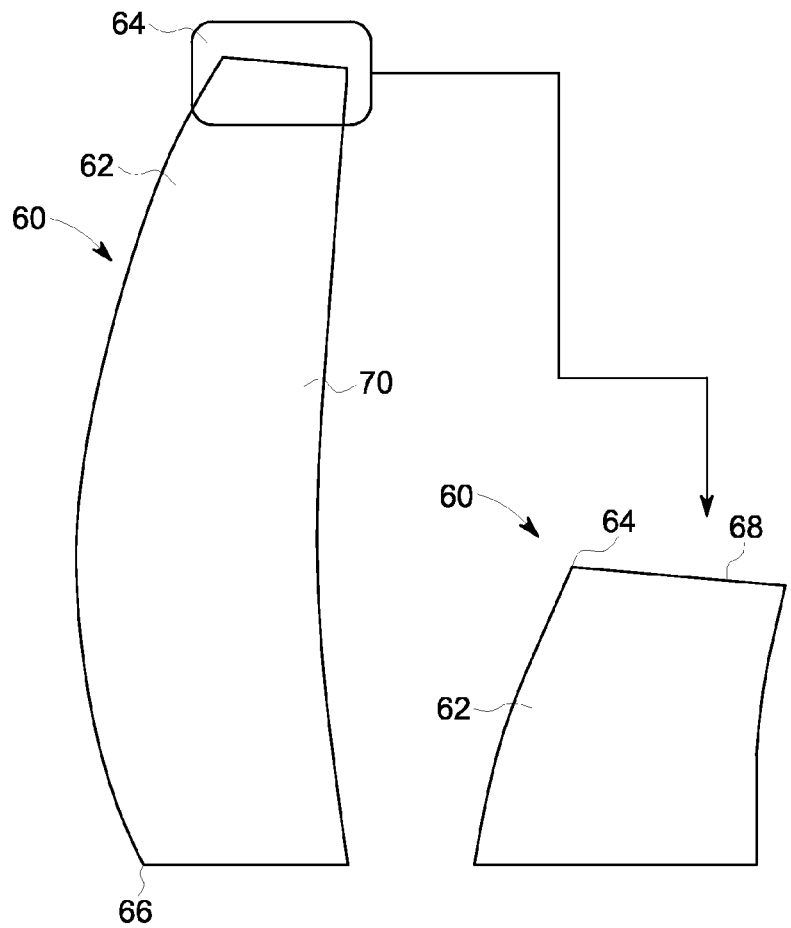
FIG. 4 is a perspective view of a prior art airfoil showing a standard tip profile.
FIG. 5 is an enlarged perspective view of a portion of the prior art airfoil of FIG. 4, showing the standard tip profile.

FIG. 4 is a perspective view of one embodiment of prior art fan blade 60, generally similar to a fan blade that may be used in an engine assembly, generally similar to the engine assembly 12 of FIG. 1-3. FIG. 5 is an enlarged view of a portion of the prior art fan blade 60, as indicated. In the illustrated embodiment, the fan blade 60 includes an airfoil portion 62, a tip portion 64, and a root portion 66. Alternatively, the airfoil portion 62 may be used with, but not limited to, rotor blades, and/or turbine blades. As illustrated, tip portion 64 of fan blade 60 is configured as a substantially straight, constant sloped line 68 defined by the circumferentially-averaged streamline contraction angle at cruise or max-climb operating condition (i.e. high flight velocity, Mach no. ~0.7-0.8). At takeoff and approach, the contraction angle is much higher, causing a tip vortex to significantly influence both the steady and unsteady blade surface pressure on a suction-side 70 of the airfoil portion 62. This creates a strong localized sound source that adversely affects community noise. This unsteady interaction noise source contributing to community noise may be dominated by the open rotor tip vortices, their sensitivity to flow unsteadiness and their proximity to nearby blade surfaces.

Figure 6:
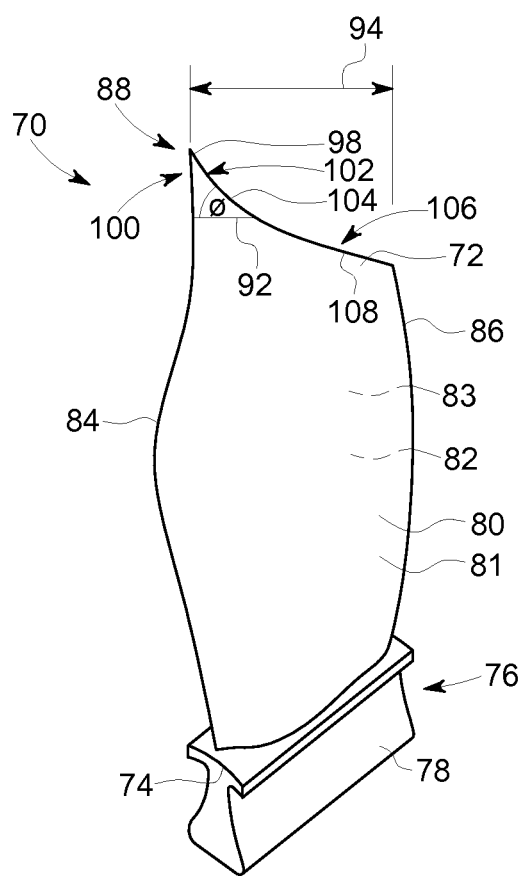
FIG. 6 is a perspective view of an exemplary airfoil of FIG. 2 showing a tip profile according to an embodiment.
Figure 7:
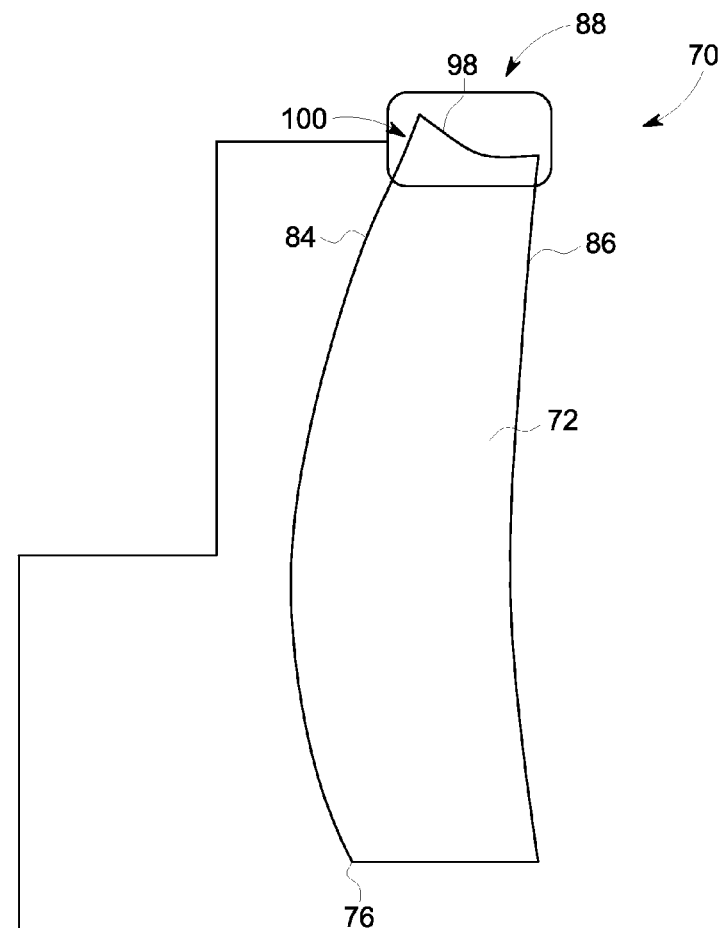
FIG. 7 is an enlarged perspective view of the exemplary airfoil of FIG. 6 showing a tip profile according to an embodiment.
Figure 8:
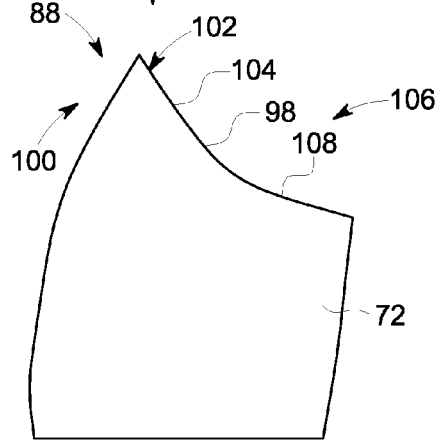
FIG. 8 is an enlarged perspective view of a portion of the airfoil of FIG. 7, showing the tip profile according to an embodiment.

Turning now to FIGS. 6-8 illustrated is an exemplary fan blade for reduced community noise according to an embodiment. In particular, FIG. 6 is a perspective view of an embodiment of an aerodynamic surface, and more particularly the fan blade embodying an airfoil including the tip profile as disclosed herein. FIG. 7 is an enlarged perspective view of the airfoil of FIG. 6 wherein like parts are identically referenced. FIG. 8 is an enlarged view of a portion of the airfoil, as indicated wherein like parts are identically referenced. More particularly, illustrated is a fan blade 70, generally similar to the fan blade 50 of FIGS. 2 and 3 that may be used in an engine assembly, generally similar to the engine assembly 12 of FIGS. 1-3. In a preferred embodiment, fan blade 70 may reside in an aft positioned bladerow, a forward positioned bladerow, or both forward and aft positioned bladerows, similar to bladerows 46 and 50 of FIGS. 2 and 3. In an embodiment, the fan blade 70 includes an airfoil 72, a platform 74, and a root portion 76. Alternatively, the airfoil 72 may be used with, but not limited to, rotor blades, and/or turbine blades. In an embodiment, the root portion 76 includes an integral dovetail 78 that enables the airfoil 72 to be mounted to a disk, such as a fan rotor disk. The airfoil 72 includes a first contoured sidewall 80 and a second contoured sidewall 82. Specifically, in an embodiment, the first contoured sidewall 80 defines a suction side 81 of the airfoil 72, and the second contoured sidewall 82 defines a pressure side 83 of the airfoil 72. The sidewalls 80 and 82 are coupled together at a leading edge 84 and at an axially-spaced trailing edge 86. The trailing edge 86 is spaced chord-wise and downstream from the leading edge 84. The airfoil 72 includes a thickness measured between the pressure side 83 and the suction side 81 extending from the leading edge 84 to the trailing edge 86, whereby the airfoil thickness varies in a span-wise direction. The pressure side 83 and the suction side 81, and more particularly first contoured sidewall 80 and second contoured sidewall 82, respectively, each extend longitudinally, or radially outward, from the root portion 76 to a tip portion 88. Alternatively, the airfoil 72 may have any conventional form, with or without the dovetail 78 or platform portion 74. For example, the airfoil 72 may be formed integrally with a rotor disk in a blisk-type configuration that does not include the dovetail 78 and the platform portion 74.

In an embodiment, the airfoil 72 includes a tip 98 defining a tip profile 100 at a tip portion 88. The tip profile 100 is defined by an increased radial angle 92 in a front portion of the airfoil 72, near the leading edge 84. The increased radial angle 92 alters the shear layer development feeding into a tip vortex created at the tip portion 88 and reduces the magnitude of unsteady pressure on a surface of the suction side 81 near the tip portion 88.

Known aft rotor tip profiles may be defined relative to a streamline contraction angle at cruise or max climb, i.e. high flight velocity. At takeoff, with a low flight Mach number, the streamline contraction angle is higher. This causes the tip vortex to influence the surface pressure (steady/unsteady) at the suction side of the tip portion significantly and creates a very localized and strong noise source. The novel tip profile 100 disclosed herein for an airfoil, such as airfoil 72, enables a substantial reduction in noise associated with aft tip vortex/gust interaction while limiting the aerodynamic impact to be effectively neutral in fan aerodynamic efficiency.

As illustrated in FIG. 6, tip profile 100 is defined by the tip 98 wherein a curve having a reducing slope defines the tip profile. More particularly, a first portion 102 of the tip profile 100 is located near the leading edge extending generally chord-wise along at least a portion of a chord length 94 and defining a first slope 104. A second portion 106 of the tip profile 100 is located adjacent the first portion 102 extending generally chord-wise between the first portion 102 to the trailing edge 86 of the airfoil 72 and defining a second slope 108. The tip profile 100 is configured wherein the first slope 104 is greater than the second slope 108, thereby defining a reducing slope tip profile 100. In an embodiment, the first portion 102 and the second portion 106 are defined having no slope discontinuity to form a smooth curve profile. In an embodiment, the first portion 102 of the tip profile having the first slope 104 extends generally chord-wise from the leading edge 84 to approximately 25% of the chord length 94. Thus, the second portion 106 of the tip profile having the second slope 108 extends generally chord-wise extending from the first portion 102 to the trailing edge 86, thus approximately 75% of the remaining chord length 94. In an alternate embodiment, the first portion 102 of the tip profile having the first slope 104 may extend less than 25% of the chord length 94 from the leading edge 84, and thus the second portion 106 of the tip profile having the second slope 108 may extend greater than 75% of the chord length 94 from the first portion 102 to the trailing edge 86. In yet another alternate embodiment, the first portion 102 of the tip profile having the first slope 104 may extend more than 25% of the chord length 94 from the leading edge 84, and thus the second portion 106 of the tip profile having the second slope 108 may extend less than 75% of the chord length 94 from the first portion 102 to the trailing edge 86. The slope configurations shown are not intended to be limiting and additional slope configurations wherein a plurality of slopes, with no slope discontinuity define a reducing slope are anticipated by this disclosure. Determination and optimization of the change in slope is dependent on the engine application and fan design, and is affected by differences between design (e.g., cruise) and takeoff flight conditions, in particular, the changes in thrust, flight velocity and fan rotation rate, i.e., fan advance ratio. The chordwise location of the change in slope is affected by the blade design (e.g., sweep), mean aerodynamic loading, etc., and the effects these have on the strength and distribution of the tip vorticity. Detailed implementation and optimization of this novel tip profile to reduce noise while simultaneously minimizing aerodynamic performance penalty is accomplished using detailed computational simulations of the aerodynamic flow and blade unsteady surface pressure resulting from its unsteady interaction with an upstream unsteady disturbance.

The tip profile 100 reduces the open rotor noise and aeromechanical loading of impinging wakes and vortices upon an aft positioned fan blade airfoil, such as airfoil 72. More specifically, the tip profile 100 provides for a reduction in the blade unsteady response to its own vortex pulsating and oscillating under the action of incident flow disturbances from upstream. As previously stated, of particular interests is a reduction in fan tone noise emanating from unducted fan (or open rotor) propulsion systems. The novel tip profile enables a reduction in open rotor noise and may provide an effective alternative to other noise designs/technologies that require undesirable performance compromise.

Further disclosed is a method of fabricating an airfoil. The method includes fabricating at least one airfoil including a root portion, a tip portion, a suction side and a pressure side coupled together at a leading edge and at a trailing edge spaced chord-wise and downstream from the leading edge. The airfoil includes a plurality of chord sections having a chord length and extending in a chord-wise direction between the leading edge and the trailing edge of the airfoil and spaced apart along a length of the airfoil in a span-wise direction between the root portion and the tip portion. The tip portion comprises: a tip profile defining a reducing slope with no slope discontinuity extending from the leading edge at the tip portion along at least a portion of the chord length, wherein the tip profile is configured to reduce high unsteady pressure near the tip portion of the airfoil.

An airfoil tip portion configured in this manner addresses the unsteady aerodynamic and aeroacoustic response of a blade to a relative unsteady incoming flow disturbance. More specifically, the airfoil tip portion configured as described herein facilitates a reduction in unsteady airfoil response of the wake flow impinging on the tip of the airfoil such that the noise and aeromechanical loading are facilitated to be reduced. The reduction in noise resulting from a tip vortex oscillating in response to an upstream gust and thereby generating high unsteady pressure fluctuations at the airfoil tip portion may facilitate engine system performance improvements such as reducing the axial distance necessary between the airfoils and upstream components. As a result, engine efficiency and performance are facilitated to be improved in comparison to engines using standard airfoils without a tip profile defined on a tip portion of at least one airfoil. In addition, the reduction in radiated noise and aeromechanical loading are achieved without an increase in blade or vane weight, without substantially decreasing aerodynamic performance, and without any otherwise impact on the overall engine system (length, weight, structure, etc.). In an embodiment, the tip profile design disclosed herein may allow for a change in engine design that would otherwise in some manner increase noise (e.g., reduced fan-fan axial separation distance, reduced fan diameter, increased fan tip speed, etc.) but allow for maintenance of target noise levels while gaining overall system performance.

Exemplary embodiments of airfoils including fan blades are described above in detail. The airfoils are not limited to the specific embodiments described herein, but rather, may be applied to any type of airfoil that are subjected to impinging wakes, vortices, and turbulence from an upstream object, such as a fan blade, stator, airframe, or an unsteady fluid flow. The airfoils described herein may be used in combination with other blade system components with other engines.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

The invention claimed is:

1. An unducted contra-rotating fan engine comprising:
an unducted fan section including a first fan blade row and a second fan blade row axially spaced aftward from the first fan blade row, the second fan blade row including a plurality of airfoils, each airfoil comprising:
a root portion and a tip portion defining a leading edge tip, wherein the tip portion is configured extending radially outward from the root portion;
a suction side and a pressure side coupled together at a leading edge and a trailing edge spaced chord-wise and downstream from the leading edge;
a plurality of chord sections having a chord length and extending in a chord-wise direction between the leading edge and the trailing edge of the airfoil and spaced apart along a length of the airfoil in a span-wise direction between the root portion and the tip portion; and
a tip profile defining a first portion having a first reducing slope extending from the leading edge tip toward the trailing edge and along at least a portion of the chord length and at least one additional portion having a second reducing slope extending from the first portion toward the trailing edge along at least a portion of the chord length,
wherein the first reducing slope is greater than the second reducing slope,
wherein the tip profile is configured to reduce high unsteady pressure near the tip portion of the airfoil.

2. An unducted contra-rotating fan engine in accordance with claim 1, wherein the second fan blade row is an aft positioned bladerow of the unducted fan section.

3. An unducted contra-rotating fan engine in accordance with claim 1, wherein the second fan blade row is a forward positioned bladerow of the unducted fan section.

4. An unducted contra-rotating fan engine in accordance with claim 1, wherein the first and second fan blade rows each including a plurality of airfoils.

5. An unducted contra-rotating fan engine in accordance with claim 1, wherein the airfoil is configured to facilitate a reduction in an unsteady response of the airfoil to its own vortex, pulsating and oscillating in response to an incident flow disturbance from upstream.

6. A fan assembly comprising:
a disk; and
a plurality of unducted fan blades coupled to the disk, each unducted fan blade of the plurality of unducted fan blades comprising:
an airfoil comprising a root portion, a tip portion defining a leading edge tip, a suction side and a pressure side coupled together at a leading edge and at a trailing edge spaced chord-wise and downstream from the leading edge;
a plurality of chord sections having a chord length and extending in a chord-wise direction between the leading edge and the trailing edge of the airfoil and spaced apart along a length of the airfoil in a span-wise direction between the root portion and the tip portion; and
a tip profile defining a first portion having a first reducing slope extending from the leading edge tip toward the trailing edge and along at least a portion of the chord length and at least one additional portion having a second reducing slope extending from the first portion toward the trailing edge along at least a portion of the chord length,
wherein the first reducing slope is greater than the second reducing slope,
wherein the tip profile is configured to reduce high unsteady pressure near the tip portion of the airfoil.

7. A fan assembly in accordance with claim 6, wherein the airfoil is configured to facilitate a reduction in noise associated with gust/tip vortex interaction.

8. A fan assembly in accordance with claim 6, wherein the first portion having the first reducing slope extends from the leading edge tip in a chord-wise direction at least 25% of the chord length of the airfoil.

9. A fan assembly in accordance with claim 6, wherein the first portion having the first reducing slope extends from the leading edge tip in a chord-wise direction less than 25% of the chord length of the airfoil.

10. A fan assembly in accordance with claim 6, further including the tip profile defining the first portion having the first reducing slope extending from the leading edge tip along at least a portion of the chord length and wherein the at least one additional portion is a second portion having the second reducing slope, wherein the second reducing slope extends from the first portion to the trailing edge, and wherein the first reducing slope is greater than the second reducing slope.

11. A fan assembly in accordance with claim 6, wherein the airfoil is one of an unducted fan blade or a rotor blade.

12. A fan assembly in accordance with claim 11, wherein the airfoil is a fan blade of an aft positioned bladerow of an unducted fan engine.

13. A fan assembly in accordance with claim 11, wherein the airfoil is a fan blade of a forward positioned bladerow of an unducted fan engine.

14. A fan assembly in accordance with claim 11, wherein the airfoil is a fan blade of a forward positioned bladerow of an unducted fan engine and an aft positioned bladerow of an unducted fan engine.

* * * * *